(No Model.)
S. S. WHEELER.
METHOD OF CONSTRUCTING FIELD MAGNETS OF ELECTRIC MOTORS.
No. 451,885. Patented May 5, 1891.
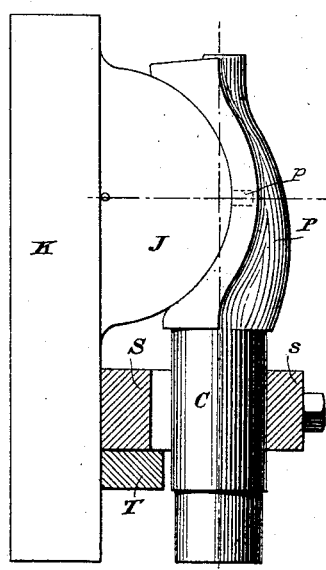
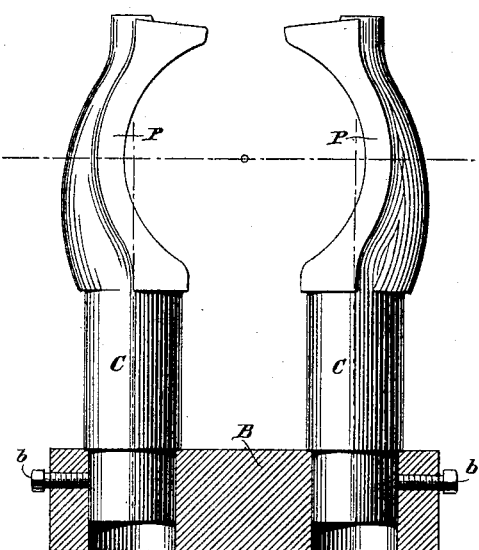
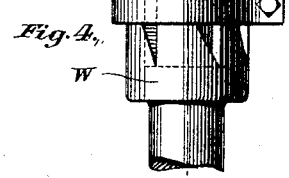
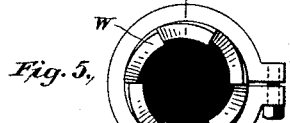
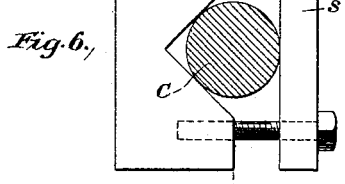
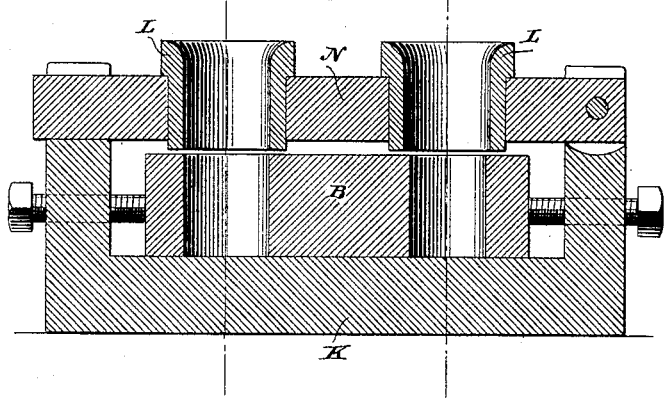
Witnesses
Geo. W. Breek.
Saml F. Macpeak.
Inventor
S. S. Wheeler
By his Attorney
Chas. G. Curtis

UNITED STATES PATENT OFFICE.

SCHUYLER S. WHEELER, OF NEW YORK, N. Y., ASSIGNOR TO THE CROCKER-WHEELER ELECTRIC MOTOR COMPANY, OF SAME PLACE.

METHOD OF CONSTRUCTING FIELD-MAGNETS OF ELECTRIC MOTORS.

SPECIFICATION forming part of Letters Patent No. 451,885, dated May 5, 1891.

Application filed September 13, 1890. Serial No. 364,910. (No model.)

*To all whom it may concern:*

Be it known that I, SCHUYLER S. WHEELER, of the city, county, and State of New York, have invented certain new and useful Improvements in the Method of Constructing Field-Magnets of Electric Motors and Dynamo-Electric Machines, of which the following is a specification.

The object of my invention is to provide a simple, inexpensive, and accurate mode of forming and fitting together the several parts composing the field-magnet and its support, and especially to enable this to be done in the case where parts of the field consist of wrought-iron forgings or parts more or less roughly formed, and in such a way as to require the least possible amount of machine-shaping.

My invention will be explained by reference to the accompanying drawings, in which—

Figure 1 represents one portion of the field-magnet comprising the pole-piece and the core proper, a frame in which it is clamped in a certain fixed position, and a tool for shaping the end of the core according to my invention. Fig. 2 shows the completed field, with the parts shown partly in elevation and partly in section; and Fig. 3 shows a frame or jig for boring or shaping the base so as to receive the cores according to my invention. Fig. 4 illustrates in side elevation a milling tool in position for milling or dressing the end of a field-magnet core held in alignment with the axis of the core, and Fig. 5 is an end or plan view of said tool. Fig. 6 is a cross-sectional view of Fig. 1, showing the field-magnet in position between its support and clamp.

I prefer to construct my field-magnet of two cores C C, formed with pole-pieces P P, attached and fitted in the yoke or base B, as clearly shown in Fig. 2. These cores and pole-pieces I prefer to construct in the form of wrought-iron forgings, and these may be most readily and cheaply made of the required accuracy in shops by drop-forging them in dies in the well-known way.

The great advantage of the wrought-iron cores and pole-pieces is that they can be made in one piece and the core can be as small as possible in section and still have the necessary magnetic capacity, and by drop-forging them they can be brought to shape with sufficient accuracy to enable them to be easily manufactured by my new method of machining and fitting the parts together.

The field-cores C C as they come from the drop-forging operation I clamp upon a block or jig K, mounted upon the slide or table of a suitable milling-machine, so that the core can be fed along endwise into a milling tool or cutter made in the form of a "hollow mill," which revolves in the machine. The field-core C is placed so that the concave side of its pole-pieces fits upon a cylindrical block J, forming part of the jig K and set in such a position as to bring the axis of the hollow milling-tool W, provided with an adjustable retaining-collar located around the outer circumference of its teeth, concentric with the axis of the cylindrical part of the core C. The straight part of the core C is held in true position by a support S and a clamp s, which secures it in place. The position sidewise of the core is determined by the support S, which is made in the form of a V or crotch, and the pin p, against which the side of the pole-piece is forced, the position of the field-core being thus determined with reference to three things—the round part of the core C, the concave face of the pole-piece, and the side or edge of the pole-piece, all of which are practically true and accurate in the drop-forgings. The field-core as thus clamped in position is gradually fed into the hollow milling-tool W, and the end of the core thus reduced to a uniform size and perfectly true cylindrical shape, the end of the core being shaped entirely and accurately with reference to the concave face of the pole-piece. The movement of the core is continued until the milling-tool strikes the stop T, thus determining the length of core milled off in this way and leaving a shoulder at a uniform point, which determines the depth to which the cores sink when slipped into the yoke or bed-plate B, which unites them together. The bed-plate of the machine itself may preferably be employed to form the yoke and at the same time the support or mounting of the field-cores, and as this may be made large it may as well be made of cast-iron. In order to fit the cores into this bed-plate B in their true position, so that the faces of the pole-pieces form a true cylindrical space for the armature, (which is especially important where a form of armature is employed in which the iron core fills the armature-space and reaches out to the faces of the pole-pieces,) I clamp the base in a boring frame or jig K, provided with a hinged cover or portion N, provided with drill-bushings L L, placed so that their axes are exactly the same distance apart as are the axes of the field-cores C C when they are in their true positions. This is easily found by measurement or by experiment, and when they are once set all that is necessary is to place the jig K in a suitable drill-press and drill the holes in the bed-plate, as clearly shown. Adjustment-screws are provided on opposite sides of the boring-frame K for centering the yoke or bed-plate B accurately beneath the drill-bushings L L.

By this simple method of centering and milling the ends of the field-magnet cores held upon a fixed former J, adapted to accurately fit into the curvilinear portion of the field-pole, I am enabled to construct each field-core so that it is the exact counterpart of its fellow, and by the accurate method of centering and drilling the yoke B when held in a jig or form K, as shown in Fig. 3, I am enabled to construct yokes for my machines which shall receive the milled ends of the field-cores, said cores being always in exact alignment and at equal distances from each other, thus assuring an absolutely cylindrical opening between the free ends of the field-cores for the reception of the armature. In other words, all field-cores made by my improved method are so exactly similar that they may be interchanged at all times without fear of in any way disturbing the mechanical symmetry of the entire machine.

It will thus be seen that I devise by this method of construction a field-magnet which when put together is absolutely symmetrical, a feature which is of great importance in the construction of electric motors or dynamo-electric machines, it being absolutely essential for the most perfect maintenance of the magnetic circuit in such machines that there be a minimum amount of air-space resistance, and this is accomplished by the construction of and adaptation of these parts in the manner above set forth.

I am aware that tools have heretofore been devised for dressing the ends of cylindrical bodies of metal so as to adapt them to be fitted into cylindrical openings, and I make no claim hereinafter broad enough to include the use of such tools, my claims being directed to novel methods of construction of field-magnets for electric motors, whereby the most perfect symmetry of organization may be had and a minimum amount of reluctance offered to the passage of the magnetic lines of force.

What I claim as my invention, and desire to secure by Letters Patent, is—

1. The method of forming field-magnets of electric motors or dynamo-electric machines, which consists in boring the yoke or base and trimming the ends of the field-forgings with reference to the center of their concave parts, so that when assembled the cylindrical ends of the field-forgings will fit into the borings in the yoke or base and the parts form a true cylindrical space for the armature, substantially as described.

2. The method herein described of constructing the field-magnets of electric motors and dynamo-electric machines, consisting in forming each core and pole-piece in one portion, hollow-milling the end of the core with reference to the concave face of the pole-piece, and boring suitable holes in a bed-plate or yoke at a fixed distance, so that when the cores are slipped into the bed-plate their pole-pieces form a true cylindrical space to receive the armature.

3. The method herein described of constructing the field-magnets of electric motors and dynamo-electric machines, consisting in forming each core and pole-piece in one portion, fixing the core and pole-piece in a milling-machine table in such a position that the axis of the core coincides with the axis of a hollow-milling tool, and then hollow-milling the end of the core to a definite point and fitting the cores thus milled into a bed-plate or yoke suitably bored to receive them and support them so that their faces will form a true cylindrical space to receive the armature.

4. The described method of forming the field-magnets of an electric motor or dynamo-electric machine, consisting in maintaining the cores in a fixed position against a cylindrical block having the same diameter as the armature and in trimming the ends of the cores while thus held, then boring the yoke while held in a fixed position, and finally assembling the parts, substantially as described.

5. The described apparatus for preparing field-magnet cores preparatory to attaching said cores to their yokes, consisting of a cylindrical block having the same contour as the free end of the field-magnet core, in combination with a support and clamp adapted to hold the core in a fixed position preparatory to milling the end which is to be fixed to the yoke, substantially as described.

6. The described apparatus for boring the yoke of an electric motor or dynamo-electric machine, consisting of a boring-frame having drill-bushings secured to a removable portion thereof, in combination with adjustable means for securing the yoke in position in the frame beneath the drill-bushings, substantially as described.

SCHUYLER S. WHEELER.

Witnesses:
WM. D. CALEN,
CHAS. G. CURTIS.